(12) United States Patent
Igarashi et al.

(10) Patent No.: US 10,634,639 B2
(45) Date of Patent: Apr. 28, 2020

(54) METHOD FOR PRODUCING GAS SENSOR ELEMENT

(71) Applicant: NGK SPARK PLUG CO., LTD., Nagoya-shi, Aichi (JP)

(72) Inventors: Ai Igarashi, Konan (JP); Kouji Toida, Kani (JP); Akinori Kojima, Ichinomiya (JP); Akihiro Hara, Kasugai (JP); Hitoshi Furuta, Tajimi (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 184 days.

(21) Appl. No.: 15/974,268

(22) Filed: May 8, 2018

(65) Prior Publication Data

US 2018/0328879 A1    Nov. 15, 2018

(30) Foreign Application Priority Data

May 9, 2017   (JP) ................................ 2017-093031

(51) Int. Cl.
*G01N 27/407*   (2006.01)
*G01N 27/406*   (2006.01)
(Continued)

(52) U.S. Cl.
CPC .......... *G01N 27/4072* (2013.01); *B28B 1/30* (2013.01); *B28B 1/48* (2013.01); *B28B 11/12* (2013.01);
(Continued)

(58) Field of Classification Search
CPC .. G01N 27/40; G01N 27/404; G01N 27/4077; G01N 27/4071; G01N 27/4067; G01N 27/4075; G01N 27/409; G01N 27/419; G01N 27/4074; G01N 27/406; G01N 27/4073; B28B 1/48; B28B 1/30; B28B 11/14; B28B 11/243; B28B 11/12; C04B 35/106; C04B 37/001; C04B 2237/343; C04B 2237/62
See application file for complete search history.

(56) References Cited

U.S. PATENT DOCUMENTS

2003/0201193 A1   10/2003   Moriguchi et al.
2006/0185978 A1*   8/2006   Nagao ................ G01N 27/4071
                                                                    204/424
(Continued)

FOREIGN PATENT DOCUMENTS

JP    2001-153835 A    6/2001

*Primary Examiner* — Alex B Efta
(74) *Attorney, Agent, or Firm* — Sughrue Mion, PLLC

(57) ABSTRACT

A method for producing a gas sensor element (10), the gas sensor element including a diffusive porous layer (113) disposed in a measurement chamber (111) and exposed to the outside and a ceramic insulating layer (115) forming sidewalls of the measurement chamber. The method includes transferring green diffusive porous layer pieces (113*x*) cut in advance so as to have prescribed dimensions onto a first ceramic green sheet (110*x*); applying an insulating paste which later becomes the ceramic insulating layer to the first ceramic green sheet; laminating the first ceramic green sheet onto a second ceramic green sheet (120*x*) to form a ceramic laminate (200*x*); cutting the ceramic laminate along prescribed cutting lines C to obtain a plurality of gas sensor element pieces 10*x*; and firing the gas sensor element pieces.

4 Claims, 13 Drawing Sheets

(51) Int. Cl.
*G01N 27/404* (2006.01)
*G01N 27/40* (2006.01)
*B28B 11/12* (2006.01)
*B28B 11/24* (2006.01)
*B28B 11/14* (2006.01)
*B28B 1/48* (2006.01)
*C04B 37/00* (2006.01)
*B28B 1/30* (2006.01)
*B32B 18/00* (2006.01)
*C04B 35/106* (2006.01)

(52) U.S. Cl.
CPC ............ *B28B 11/14* (2013.01); *B28B 11/243* (2013.01); *B32B 18/00* (2013.01); *C04B 37/001* (2013.01); *G01N 27/404* (2013.01); *G01N 27/406* (2013.01); *G01N 27/4073* (2013.01); *G01N 27/4075* (2013.01); *C04B 35/106* (2013.01); *C04B 2237/343* (2013.01); *C04B 2237/62* (2013.01); *G01N 27/40* (2013.01)

(56) References Cited

U.S. PATENT DOCUMENTS

2006/0219554 A1\* 10/2006 Mori .................. G01N 27/4071 204/424
2013/0075256 A1\* 3/2013 Saitou ................ G01N 27/4077 204/427
2016/0054256 A1\* 2/2016 Sakuma ............. G01N 27/4071 204/408

\* cited by examiner

METHOD FOR PRODUCING GAS SENSOR ELEMENT

BACKGROUND OF THE INVENTION

1. Field of the Invention

The present invention relates to a method for producing a gas sensor element that is advantageously used to detect the concentration of a specific gas contained in combustion gas or exhaust gas from, for example, a combustor or an internal combustion engine.

2. Description of the Related Art

Conventionally, a gas sensor for detecting the concentration of a specific component (such as oxygen) in exhaust gas from an internal combustion engine has been used. This gas sensor includes a gas sensor element disposed therein. The gas sensor element includes a solid electrolyte body and further includes a reference gas-side electrode and a measurement gas-side electrode that are disposed on the solid electrolyte body, and the measurement gas-side electrode is exposed to a measurement chamber inside the element. The measurement chamber is in communication with the outside through a diffusive porous layer, and the diffusive porous layer allows gas diffusion between the outside and the measurement chamber under prescribed rate-determining conditions.

However, the conventional gas sensor has a problem in that production-related variations of the gas sensor element cause a variation in the dimension of the diffusive porous layer and a variation in gas diffusion distance, whereby the output of the gas sensor element changes. One technique developed for adjusting the gas diffusion distance and the output from a gas sensor element is to trim side surfaces of the gas sensor element to partially remove the diffusive porous layer extending along the side surfaces (see Patent Document 1).

[Patent Document 1] Japanese Patent Application Laid-Open (kokai) No. 2001-153835 (FIG. 1)

3. Problems to be Solved by the Invention

However, when the gas diffusion distance is changed by reducing the size of the diffusive porous layer in order to adjust the output of the gas sensor element, a problem arises in that the responsivity of the gas sensor element changes.

SUMMARY OF THE INVENTION

It is therefore an object of the present invention to provide a method for producing a gas sensor element which includes a diffusive porous layer and in which a variation in output and a variation in responsivity due to production-related variations, etc., are reduced.

The above object of the present invention has been achieved by providing (1) a method for producing a gas sensor element extending in an axial direction and including a solid electrolyte body, a reference gas-side electrode and a measurement gas-side electrode disposed on surfaces of the solid electrolyte body, a measurement chamber to which the measurement gas-side electrode is exposed, a diffusive porous layer disposed in the measurement chamber and exposed to the outside, and a ceramic insulating layer forming sidewalls of the measurement chamber. The gas sensor element producing method comprises at least a transferring step of preparing a sheet including a plurality of green diffusive porous layer pieces that are cut in advance to have prescribed dimensions and that later become, through firing, the diffusive porous layer and transferring the plurality of green diffusive porous layer pieces from the sheet onto an insulating first ceramic green sheet having a size that allows for production of a plurality of the gas sensor elements therefrom; an application step of applying an insulating paste that later becomes the ceramic insulating layer through firing to the first ceramic green sheet; a laminating step of preparing a second ceramic green sheet provided with a plurality of the solid electrolyte bodies each provided with the reference gas-side electrode and the measurement gas-side electrode and laminating the first ceramic green sheet onto the second ceramic green sheet to thereby form a ceramic laminate; a cutting step of cutting the ceramic laminate along prescribed cutting lines to obtain a plurality of gas sensor element pieces; and a firing step of firing the gas sensor element pieces to thereby obtain the gas sensor elements.

In the gas sensor element production method (1) above, the green diffusive porous layer pieces are cut in advance so as to have the prescribed dimensions and transferred onto the first ceramic green sheet to later become the gas sensor element pieces. Therefore, when the gas sensor element pieces are separated through cutting and are fired to produce the gas sensor elements, variations in dimensions of the diffusive porous layer due to production-related variations can be reduced. Further, variations in output of the gas sensor elements due to variations in gas diffusion distance can be reduced. Since the diffusive porous layers of the gas sensor elements have the same dimensions, variations in responsivity of the gas sensor elements due to variations in the gas diffusion distance can also be reduced.

In a preferred embodiment (2) of the gas sensor element producing method (1) above, in the transferring step, each green diffusive porous layer piece is preferably transferred such that the green diffusive porous layer piece extends across a corresponding one of the cutting lines. Also, a centerline of the green diffusive porous layer piece extending along its longitudinal direction is aligned with the corresponding one of the cutting lines.

In the gas sensor element production method (2), the green diffusive porous layer pieces are cut in the cutting step so as to have a width exactly one half their original width, and the gas sensor element pieces (the gas sensor elements) can be produced such that their diffusive porous layer pieces have the same width. Therefore, the green diffusive porous layer pieces can be used with no waste.

In a preferred embodiment of the gas sensor element producing method (1) or (2) above, in the application step, the insulating paste is applied in a state in which a forward end of an elongated region where the measurement chamber is to be formed is flush with forward ends of the green diffusive porous layer pieces located adjacent to the elongated region.

The gas sensor element production method can be applied to the production of a gas sensor element having a structure in which the measurement gas flows from the forward end side of the element. In such a case, a gas introduction port can be disposed at the forward end of the measurement chamber, and the oxygen concentration output can be controlled with no delay in response to a change in concentration of oxygen in the measurement gas (no decrease in the rate of response to a change in concentration of oxygen in the measurement gas).

Effects of the Invention

According to the present invention, a variation in output of a gas sensor element including a diffusive porous layer and a variation in responsivity of the gas sensor element due to production-related variations, etc., can be reduced.

DESCRIPTION OF REFERENCE NUMERALS

Figure 1:
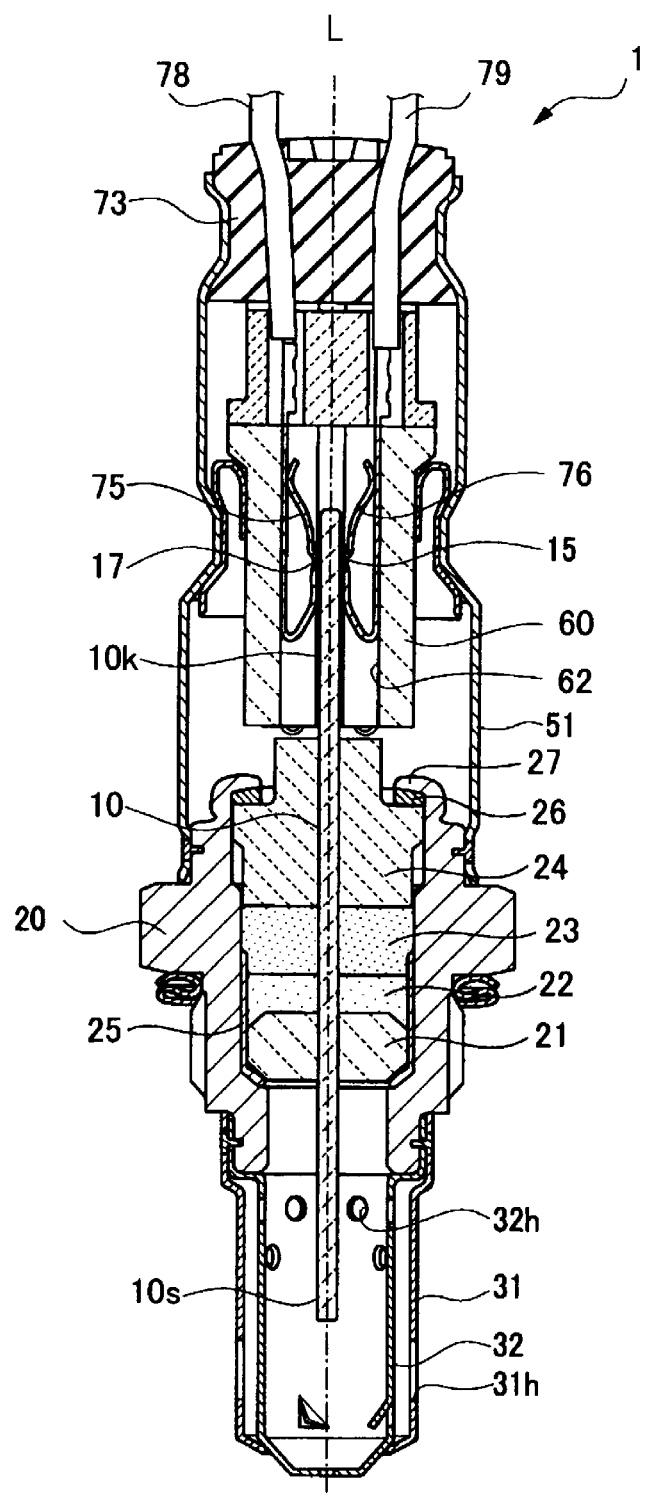
FIG. 1 is a cross-sectional view of an example of a gas sensor (oxygen sensor) produced by a gas sensor element production method according to a first embodiment of the present invention, the cross-sectional view being taken in an axial direction.

Reference numerals used to identify various features in the drawings include the following.
10, 19: gas sensor element
10$x$, 19$x$: gas sensor element piece
110$x$, 160$x$: first ceramic green sheet
111, 171: measurement chamber
113, 173: diffusive porous layer
113$x$, 173$x$: green diffusive porous layer
113$s$, 173$s$: sheet of green diffusive porous layer
115, 175: ceramic insulating layer
115$x$, 175$x$: insulating paste
120$x$, 150$x$: second ceramic green sheet
122, 152: solid electrolyte body
123, 153: reference gas-side electrode
125, 155: measurement gas-side electrode
200$x$, 250$x$: ceramic laminate
L: axial line
C: cutting line

DETAILED DESCRIPTION OF THE PREFERRED EMBODIMENTS

The present invention will next be described in greater detail with reference to the drawings. However, the present invention should not be construed as being limited thereto.

Figure 2:
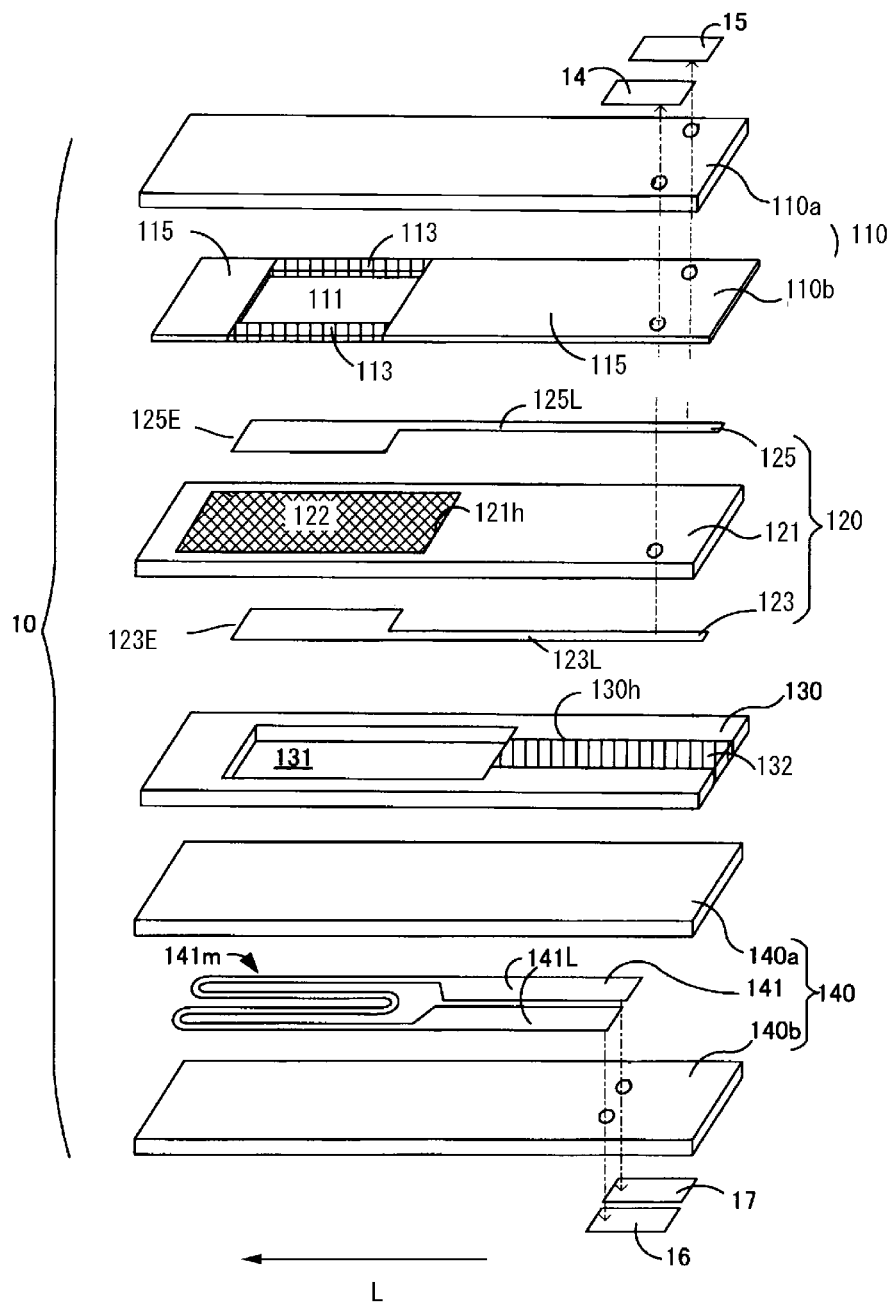
FIG. 2 is a schematic exploded perspective view of a gas sensor element.
Figure 3:
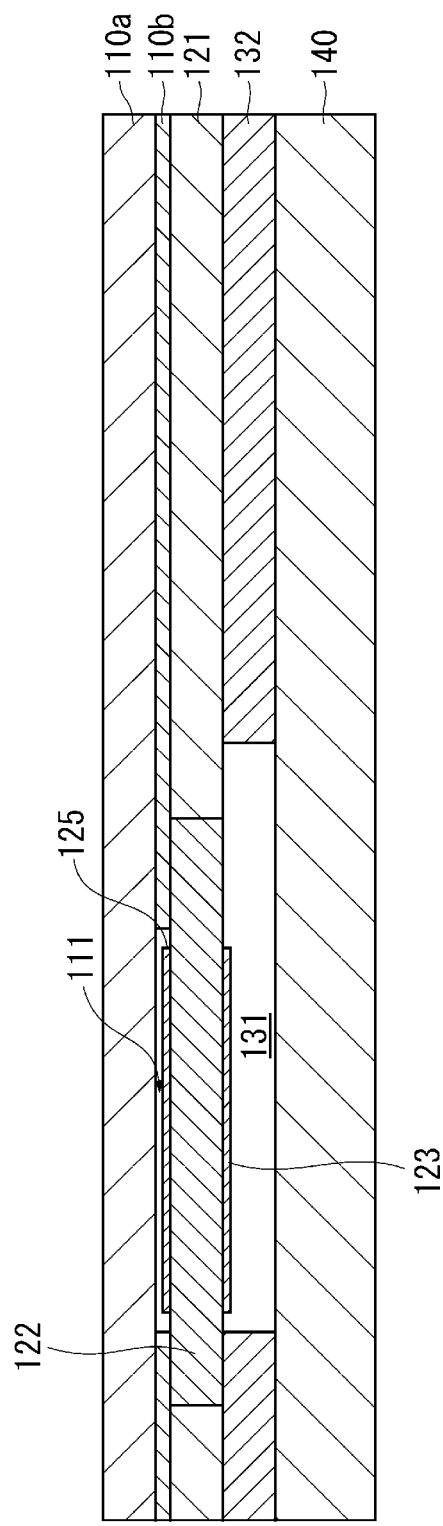
FIG. 3 is a schematic cross-sectional view of the gas sensor element, the cross-sectional view being taken in a direction orthogonal to the axial direction.

FIG. 1 is a cross-sectional view of an example of a gas sensor (oxygen sensor) 1 produced by a gas sensor element production method according to a first embodiment of the present invention, the cross-sectional view being taken in the axial direction line L. FIG. 2 is a schematic exploded perspective view of a gas sensor element 10, and FIG. 3 is a cross-sectional view of the gas sensor element 10, the cross-sectional view being taken in a direction extending along the axial line L and parallel to the drawing sheet of FIG. 1.

The gas sensor 1 includes, as main components, the gas sensor element 10 and a metallic shell 20. The gas sensor element 10 is an elongated plate-shaped element and includes a sensor cell for measuring the concentration of oxygen in exhaust gas, which is a measurement gas. The gas sensor element 10 includes a forward end portion 10$s$ in which the sensor cell is disposed and a rear end portion 10$k$ in which sensor pads 14 and 15 (only the sensor pad 15 is shown in FIG. 1) electrically connected to lead wires 79 are disposed. The gas sensor element 10 is held by the metallic shell 20 with the forward end portion 10$s$ protruding from the forward end of the metallic shell 20 and the rear end portion 10$k$ protruding from the rear end of the metallic shell 20.

The metallic shell 20 has a tubular shape for holding the gas sensor element 10 therein. A metallic tubular outer protector 31 and a metallic tubular inner protector 32 are disposed at the forward end of the metallic shell 20 and cover the forward end portion 10$s$ of the gas sensor element 10. The outer protector 31 has a plurality of gas introduction holes 31$h$, and the inner protector 32 has a plurality of gas introduction holes 32$h$. The measurement gas is introduced through the gas introduction holes 31$h$ and 32$h$ into a space around the forward end portion 10$s$ of the gas sensor element 10.

An annular ceramic holder 21, powder filled layers (hereinafter also referred to as talc rings) 22 and 23, and a ceramic sleeve 24 are disposed in this order from the forward end side within the metallic shell 20 so as to surround the outer circumference of the gas sensor element 10. A metallic holder 25 is disposed around the outer circumference of the ceramic holder 21 and the outer circumference of the talc ring 22, and a crimp packing 26 is disposed at the rear end of the ceramic sleeve 24. A rear end portion 27 of the metallic shell 20 is crimped such that the ceramic sleeve 24 is pressed toward the forward end side through the crimp packing 26.

A cylindrical outer tube 51 is disposed at the rear end of the metallic shell 20 so as to surround the rear end portion 10$k$ of the gas sensor element 10. A separator 60 is disposed inside the outer tube 51. The separator 60 surrounds the rear end portion 10$k$ of the gas sensor element 10 and holds four lead wires 78 and 79 (only two of them are shown in FIG. 1) such that they are spaced apart from each other.

The separator 60 has an insertion hole 62 extending therethrough in the direction of the axial line L, and the rear end portion 10k of the gas sensor element 10 is inserted into the insertion hole 62. Four terminal members 75 and 76 are disposed within the insertion hole 62 so as to be spaced apart from each other. The four terminal members 75 and 76 are electrically connected, respectively, to the sensor pads 14 and 15 of the gas sensor element 10 and two heater pads 16 and 17 (only the heater pad 17 is shown in FIG. 1) of the gas sensor element 10.

A grommet 73 that closes a rear end opening of the outer tube 51 is fitted into the rear end of the outer tube 51, and the four lead wires 78 and 79 pass through insertion holes of the grommet 73 and extend to the outside. The outside atmosphere is led to the rear end portion 10k of the gas sensor element 10 through an unillustrated communication passage.

Referring next to FIGS. 2 and 3, the structure of the gas sensor element 10 will be described.

The gas sensor element 10 includes a first ceramic layer 110, a second ceramic layer 120, a third ceramic layer 130, and a heater layer 140 that are sequentially stacked in a thickness direction (stacking direction) from top to bottom in FIG. 2. These layers 110 to 140 are formed of an insulating ceramic such as alumina and have rectangular plate shapes having the same outside dimensions (at least width and length).

The first ceramic layer 110 is formed by stacking a protective layer 110a and a measurement chamber layer 110b, and a rectangular measurement chamber 111 is formed in a forward end portion (a left portion in FIG. 2) of the measurement chamber layer 110b. Diffusive porous layers 113 that separate the measurement chamber 111 from the outside are disposed on both long sides of the measurement chamber layer 110b. Ceramic insulating layers 115 that form sidewalls of the measurement chamber 111 are disposed on the forward and rearward end sides of the measurement chamber 111.

The measurement chamber 111 is in communication with the outside through the diffusive porous layers 113, and the diffusive porous layers 113 allow gas diffusion between the outside and the measurement chamber 111 under prescribed rate-determining conditions. The diffusive porous layers 113 form opposite longitudinal sidewalls extending in the lengthwise direction (the direction of the axial line L) of the gas sensor element 10 and are exposed to the outside.

The second ceramic layer 120 includes: a cell layer 121 including a rectangular plate-shaped solid electrolyte body 122; a reference gas-side electrode 123 disposed on the back side of the solid electrolyte body 122; and a measurement gas-side electrode 125 disposed on the front side of the solid electrolyte body 122. A rectangular through opening 121h is provided in a forward end portion (a left portion in FIG. 2) of the cell layer 121, and the solid electrolyte body 122 is embedded in the through opening 121h. The reference gas-side electrode 123 has a reference gas-side electrode portion 123E and a lead portion 123L extending rearward from the reference gas-side electrode portion 123E. The measurement gas-side electrode 125 has a measurement gas-side electrode portion 125E and a lead portion 125L extending rearward from the measurement gas-side electrode portion 125E.

The solid electrolyte body 122, the reference gas-side electrode 123, and the measurement gas-side electrode 125 form a cell for detecting the concentration of oxygen in the measurement gas. The measurement gas-side electrode portion 125E is exposed to the measurement chamber 111, and the reference gas-side electrode portion 123E is exposed to an air introduction chamber 131 described below.

The lead portion 123L is electrically connected to the sensor pad 14 through through holes formed in the cell layer 121, the measurement chamber layer 110b, and the protective layer 110a. The lead portion 125L is electrically connected to the sensor pad 15 through through holes formed in the measurement chamber layer 110b and the protective layer 110a.

A signal from the reference gas-side electrode 123 and the measurement gas-side electrode 125 is outputted from the sensor pads 14 and 15 through the two lead wires 79 to the outside, and the concentration of oxygen is thereby detected.

The third ceramic layer 130 is a frame member having a rectangular opening serving as the air introduction chamber 131 in a forward end portion (a left portion in FIG. 2). A central portion, with respect to the width direction, of the third ceramic layer 130 is cut out to form a cut-out portion 130h extending from the air introduction chamber 131 toward the rear end of the third ceramic layer 130, and a porous layer 132 is embedded in the cut-out portion 130h.

As described above, the air introduction chamber 131 is in communication with the outside through the porous layer 132.

The heater layer 140 includes a first layer 140a, a second layer 140b, and a heating element 141 disposed between the first layer 140a and the second layer 140b. The first layer 140a faces the third ceramic layer 130. The heating element 141 includes a heat generating portion 141m having a meandering pattern and two lead portions 141L extending rearward from opposite ends of the heat generating portion 141m.

The lead portions 141L are electrically connected to the heater pads 16 and 17 through through holes formed in the second layer 140b. When electric current is applied to the heating element 141 from the heater pads 16 and 17 through the two lead wires 78, the heating element 141 generates heat, and the solid electrolyte body 122 is thereby activated.

The solid electrolyte body 122 may be formed from, for example, a partially stabilized zirconia sintered body prepared by adding yttria ($Y_2O_3$) or calcia (CaO) serving as a stabilizer to zirconia ($ZrO_2$).

The reference gas-side electrode 123, the measurement gas-side electrode 125, the heating element 141, the sensor pads 14 and 15, and the heater pads 16 and 17 may be formed from a platinum group element. Preferred examples of the platinum group element forming these components include Pt, Rh, and Pd. One of these elements may be used alone, or a combination of two or more may be used.

Referring next to FIGS. 4 to 7, a gas sensor element production method according to the first embodiment of the present invention will be described.

Figure 4A:
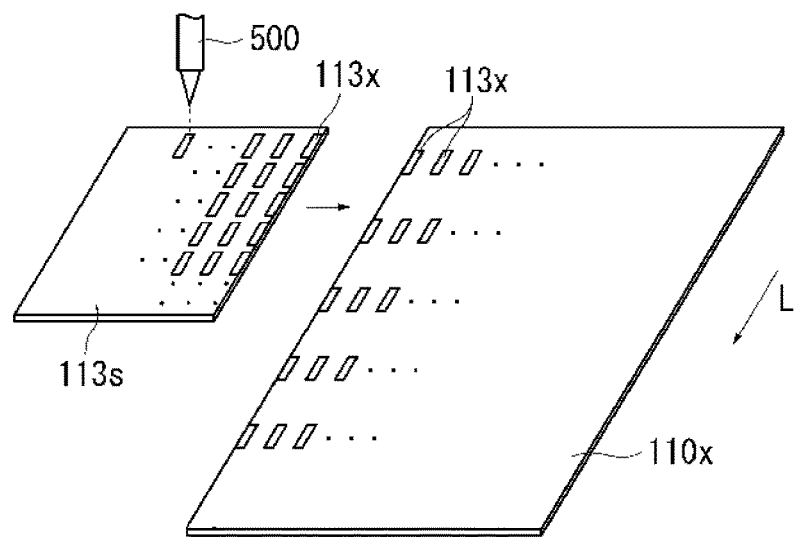
FIGS. 4A to 4C are a set of illustrations showing a transferring step and an application step in the gas sensor element production method according to the first embodiment of the present invention.

First, as shown in FIG. 4A, a sheet 113s whose composition is the same as the composition of the diffusive porous layers 113 before firing is prepared, and a plurality of green diffusive porous layer pieces 113x having prescribed dimensions are cut from the sheet 113s using, for example, a laser 500. Then, the plurality of green diffusive porous layer pieces 113x are transferred from the sheet 113s onto an insulating first ceramic green sheet 110x (a transferring step).

The first ceramic green sheet 110x becomes the protective layer 110a through firing. The first ceramic green sheet 110x has a size that allows for production of a plurality of gas sensor elements 10 therefrom. In the present embodiment, the green diffusive porous layer pieces 113x have a rectangular shape elongated in the direction of the axial line L.

Figure 4B:
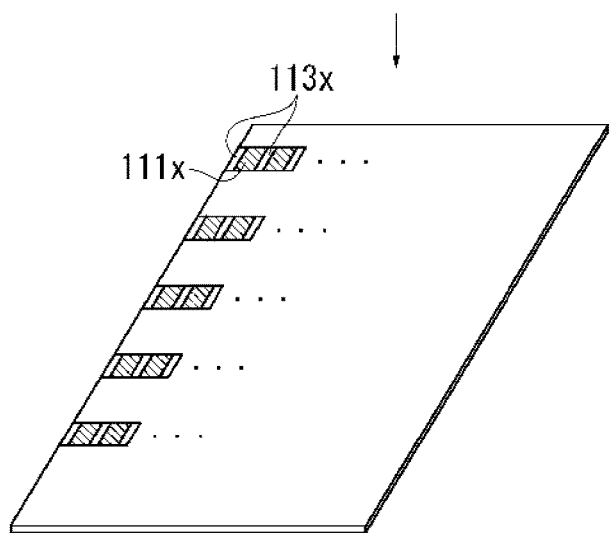

Next, as shown in FIG. 4B, a paste for a burnable carbon layer 111x is printed onto regions between adjacent green diffusive porous layer pieces 113x in the direction of the width of the gas sensor elements 10. The burnable carbon layer 111x is burnt off when the first ceramic green sheet 110x is fired, and spaces serving as measurement chambers 111 are thereby formed.

Figure 4C:
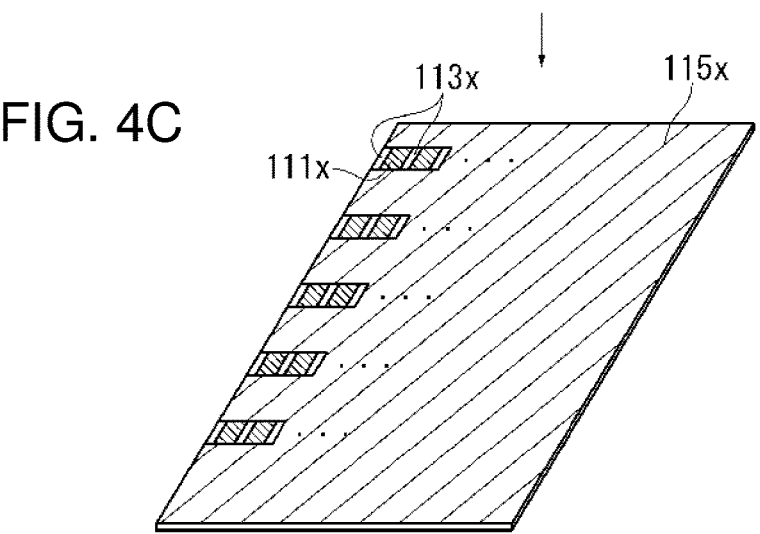

Next, as shown in FIG. 4C, an insulating paste 115x is applied to the first ceramic green sheet 110x except for the regions on which the green diffusive porous layer pieces 113x and the burnable carbon layers 111x are present (an application step). The insulating paste 115x later becomes the ceramic insulating layer 115 through firing.

Figure 5:
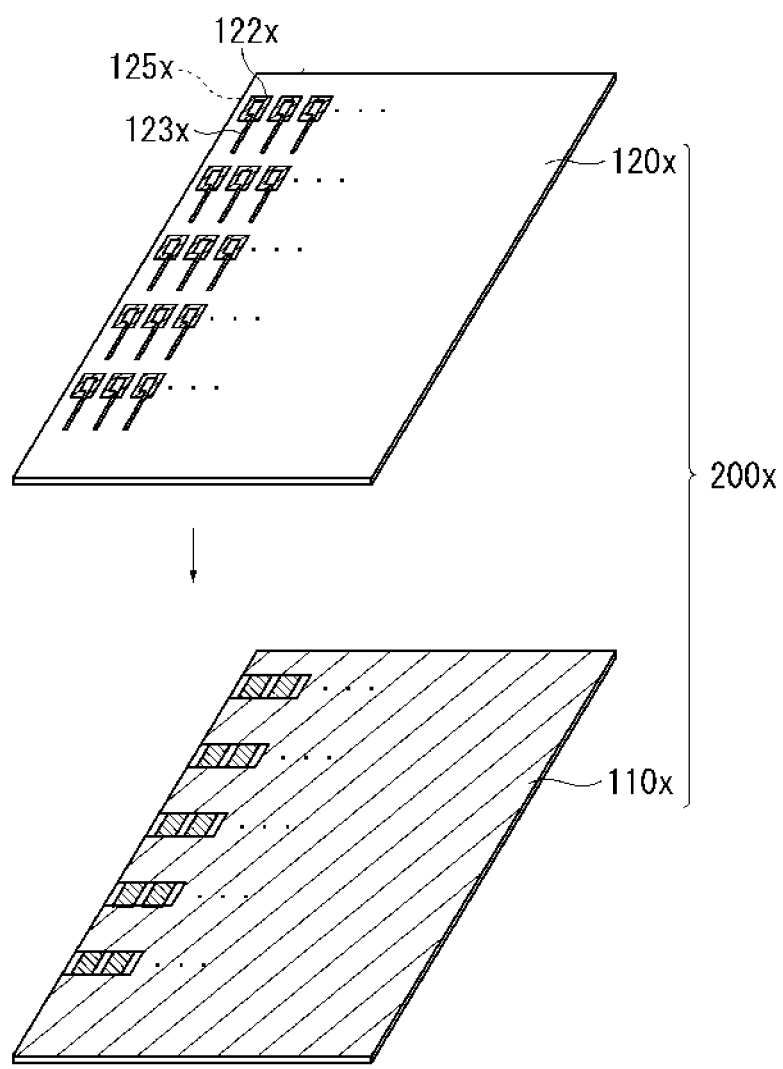
FIG. 5 is an illustration showing a laminating step in the gas sensor element production method according to the first embodiment of the present invention.

Next, as shown in FIG. 5, a second ceramic green sheet 120x is prepared. Then the first ceramic green sheet 110x and the second ceramic green sheet 120x are laminated to form a ceramic laminate 200x (a laminating step).

The second ceramic green sheet 120x later becomes the cell layer 121 (the second ceramic layer 120) through firing. The second ceramic green sheet 120x has a size that allows for production of a plurality of gas sensor elements 10 therefrom. It is also provided with a plurality of green solid electrolyte bodies 122x each provided with a green reference gas-side electrode 123x and a green measurement gas-side electrodes 125x, and the number of green solid electrolyte bodies 122x is the same as the number of gas sensor elements 10.

The green sheets 110x and 120x are laminated such that each green measurement gas-side electrode 125x on the second ceramic green sheet 120x faces a corresponding one of the burnable carbon layers 111x on the first ceramic green sheet 110x.

Figure 6A:
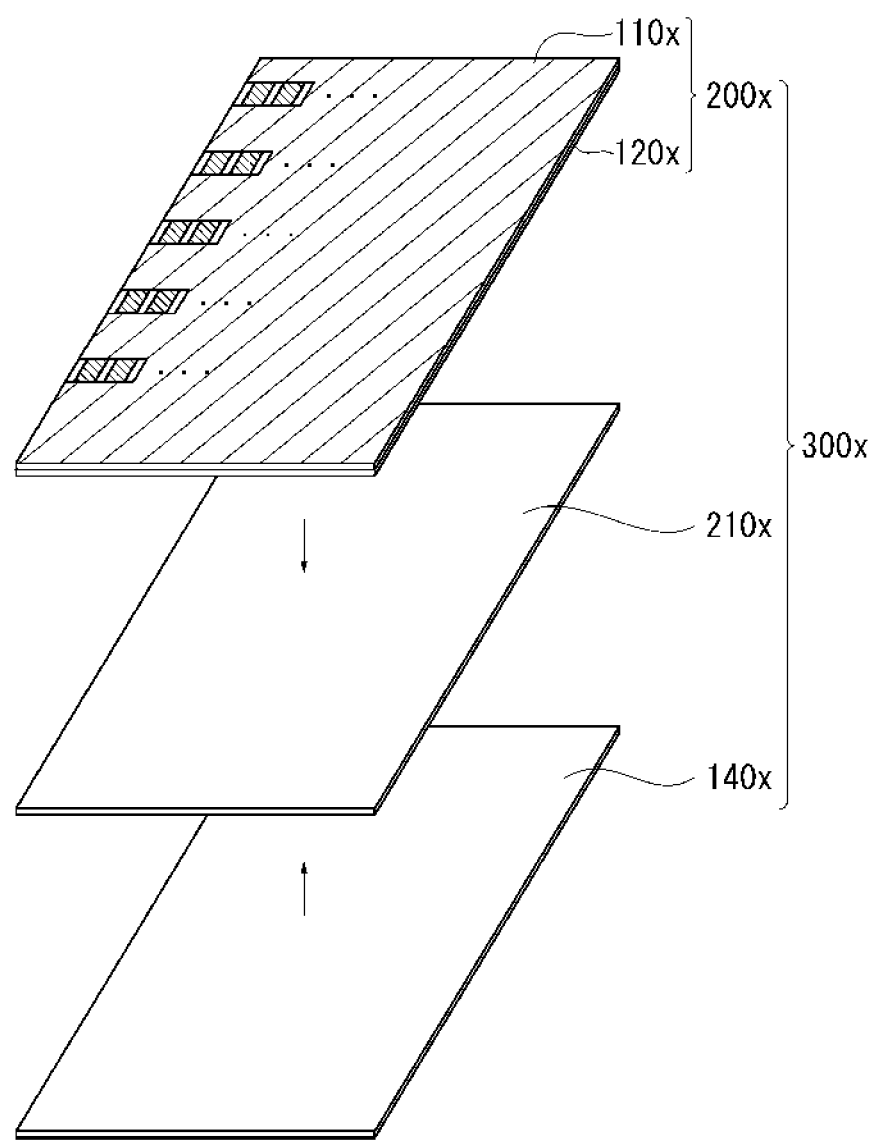
FIGS. 6A and 6B are a set of illustrations showing a cutting step in the gas sensor element production method according to the first embodiment of the present invention.

Then, as shown in FIG. 6A, a green third ceramic layer 210x and a green heater layer 140x are laminated onto the ceramic laminate 200x to thereby obtain a final laminate 300x.

Figure 6B:
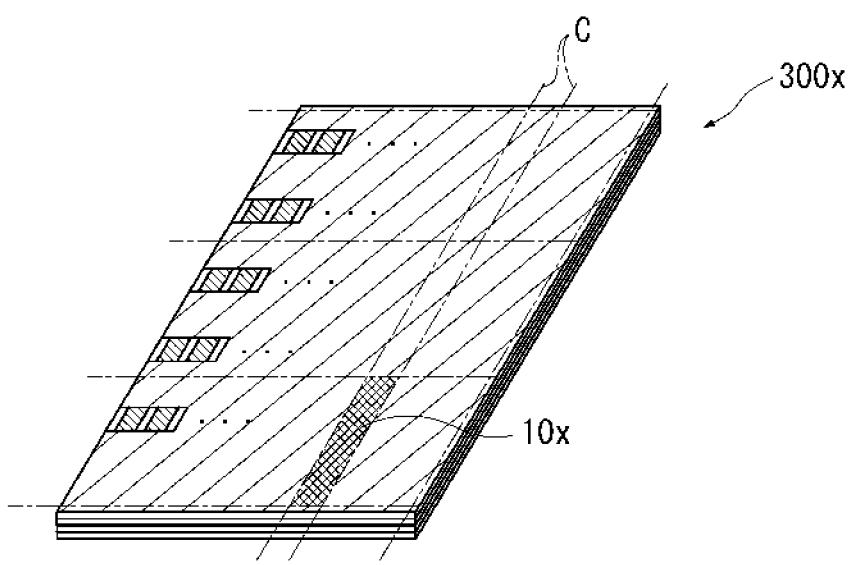

Next, as shown in FIG. 6B, the final laminate 300x including the ceramic laminate 200x is cut along prescribed cutting lines C to obtain a plurality of gas sensor element pieces 10x (a cutting step). Then, although not shown, the gas sensor element pieces 10x are fired to obtain gas sensor elements 10 (a firing step).

As described above, the green diffusive porous layer pieces 113x are cut so as to have prescribed dimensions in advance, and then transferred onto the first ceramic green sheet 110x to later become the gas sensor element pieces 10x. Therefore, when the gas sensor element pieces 10x are separated through cutting and are fired to produce the gas sensor elements 10, variations in dimensions of the diffusive porous layers 113 due to production-related variations can be reduced. Further, variations in output of the gas sensor elements due to variations in gas diffusion distance can be reduced. Since the diffusive porous layers of the gas sensor elements have the same dimensions, variations in responsivity of the gas sensor elements due to the variations in gas diffusion distance can also be reduced.

Figure 7:
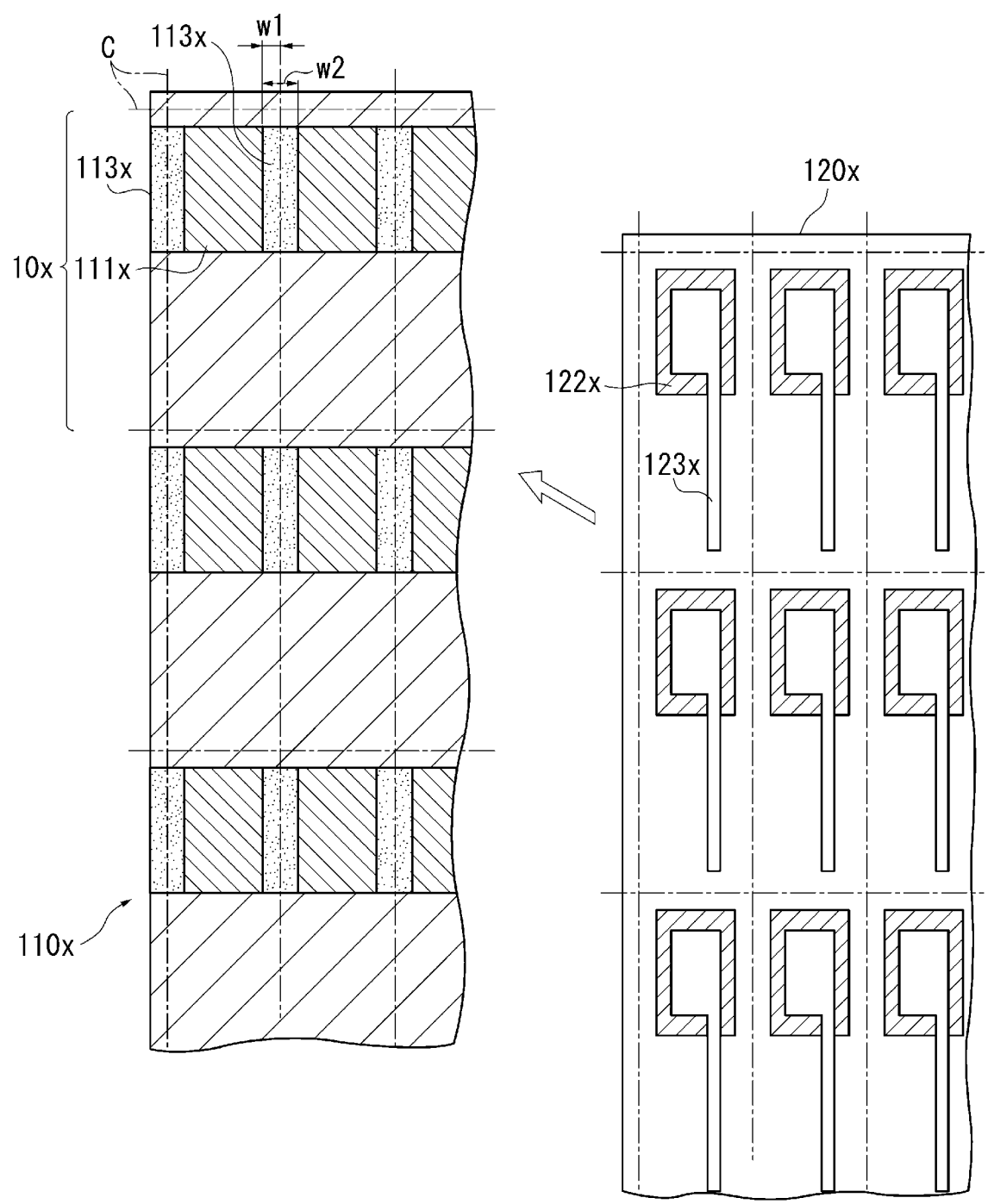
FIG. 7 is an illustration showing a first ceramic green sheet with green diffusive porous layer pieces transferred thereon and an insulating paste applied thereto.

As shown in FIG. 7, in the present embodiment, the green diffusive porous layer pieces 113x form longitudinal sidewalls of the gas sensor element pieces 10x. In the fired gas sensor element 10 shown in FIG. 2, the diffusive porous layers 113 are exposed to the outside.

In the transferring step, each green diffusive porous layer piece 113x is transferred such that the green diffusive porous layer piece 113x extends across a corresponding one of the cutting lines C. Also, the centerline of the green diffusive porous layer piece 113x extending along the surface to be exposed to the outside (in the lengthwise direction of the green diffusive porous layer piece 113x) is aligned with the corresponding one of the cutting lines C. Therefore, in the cutting step, the green diffusive porous layer pieces 113x are cut so as to have a width W1 exactly one half their original width W2, whereby the gas sensor element pieces 10x (the gas sensor elements 10) can be produced such that their green diffusive porous layer pieces 113x have the same width W1. Therefore, the green diffusive porous layer pieces 113x can be used with no waste.

In gas sensor element pieces 10x disposed at circumferential edges of the final laminate 300x, portions located outward of cutting lines C are discarded.

In the present embodiment, as shown in FIG. 7, the insulating paste is applied in a state in which a forward end of the burnable carbon layer 111x that forms each measurement chamber 111 is flush with forward ends of the green diffusive porous layer pieces 113x located adjacent to the burnable carbon layer. Therefore, when each gas sensor element has a structure in which the measurement gas flows from the forward end side of the element, a gas introduction port can be disposed at the forward end of the measurement chamber. Further, the oxygen concentration output can be controlled with no delay in response to a change in concentration of oxygen in the measurement gas (no decrease in the rate of response to a change in concentration of oxygen in the measurement gas).

Next, a second embodiment of the present invention will be described.

Figure 8:
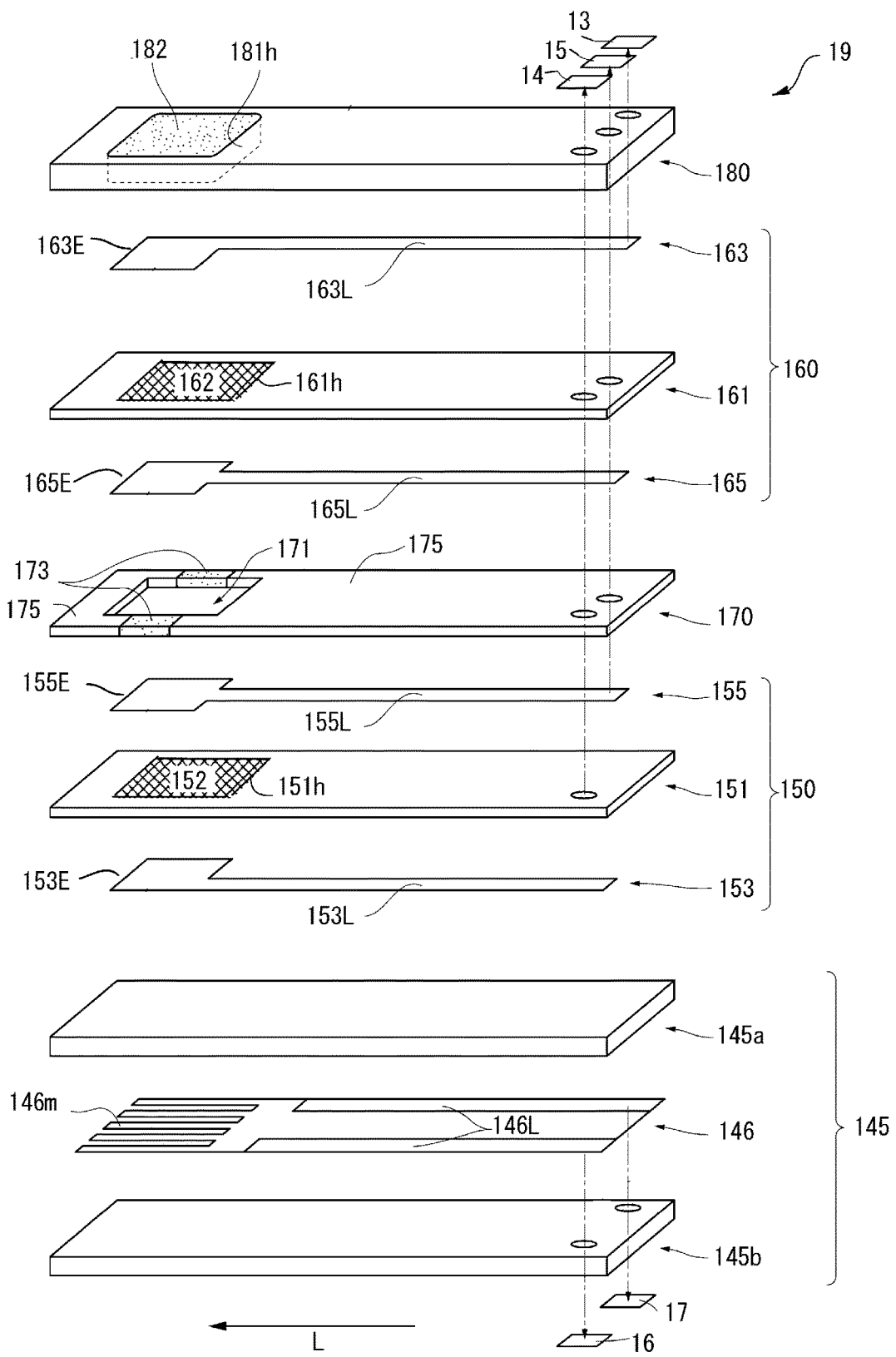
FIG. 8 is a schematic exploded perspective view of a gas sensor element produced by a gas sensor element production method according to a second embodiment of the present invention.
Figure 9:
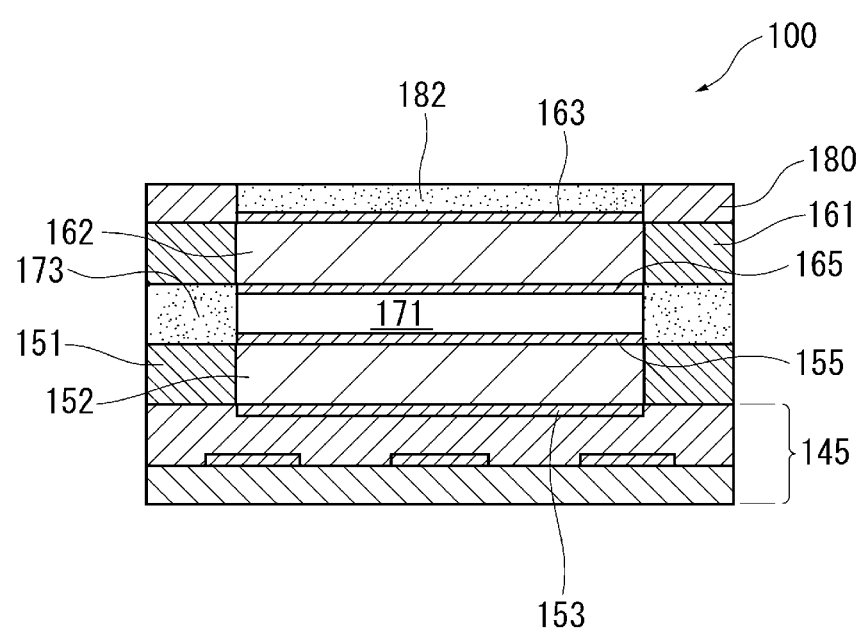
FIG. 9 is a schematic cross-sectional view of the gas sensor element, the cross-sectional view being taken in a width direction.

FIG. 8 is a schematic exploded perspective view of a gas sensor element 19 produced by a gas sensor element production method according to the second embodiment of the present invention, and FIG. 9 is a cross-sectional view 100 of the gas sensor element 19, the cross-sectional view being taken in a width direction of the gas sensor element 19.

The structure of a gas sensor to which the gas sensor element 19 is mounted is the same as that of the gas sensor 1 according to the first embodiment (FIG. 1) and is therefore not illustrated.

The gas sensor element 19 includes a first ceramic layer 180, a second ceramic layer 160, a third ceramic layer 170, a fourth ceramic layer 150, and a heater layer 145 that are sequentially stacked in the thickness direction (stacking direction) from top to bottom in FIG. 8. The layers 145 and 150 to 180 are formed from an insulating ceramic such as alumina and have rectangular plate shapes with the same outer dimensions (at least width and length).

The first ceramic layer 180 has a rectangular through opening 181h located in a forward end portion (a left portion in FIG. 8), and a porous layer 182 is embedded in the through opening 181h. The first ceramic layer 180 covers and protects the second ceramic layer 160, and the porous layer 182 covers a pump electrode 163 of the second ceramic layer 160.

The porous layer 182 is exposed to the outside, and oxygen can be pumped between the pump electrode 163 and the outside through the porous layer 182.

The second ceramic layer 160 includes a cell layer 161 including a rectangular plate-shaped solid electrolyte body 162, the above-described pump electrode 163 disposed on the front side of the solid electrolyte body 162, and a counter electrode 165 disposed on the back side of the solid electrolyte body 162. A rectangular through opening 161h is formed in a forward end portion (a left portion in FIG. 8) of the cell layer 161, and the solid electrolyte body 162 is embedded in the through opening 161h. The pump electrode 163 includes a pump electrode portion 163E and a lead portion 163L extending rearward from the pump electrode portion 163E, and the counter electrode 165 includes a counter electrode portion 165E and a lead portion 165L extending rearward from the counter electrode portion 165E.

The solid electrolyte body 162, the pump electrode 163, and the counter electrode 165 form an oxygen pump cell that pumps oxygen out of the measurement gas present in a measurement chamber 171 (which will be described below) and pumps oxygen into the measurement chamber 171. The counter electrode 165 is exposed to the measurement chamber 171, and the pump electrode 163 is in communication with the outside through the porous layer 182.

The lead portion 163L is electrically connected to a sensor pad 13 through a through hole formed in the first ceramic layer 180. The lead portion 165L is electrically connected to a sensor pad 15 through through holes formed in the cell layer 161 and the first ceramic layer 180.

An external device connected to the sensor pads 13 and 15 through two lead wires controls the direction and magnitude of an electric current flowing between the pump electrode 163 and the counter electrode 165 in accordance with the concentration of oxygen in the measurement chamber 171, whereby oxygen is pumped into or out of the measurement chamber 171.

The measurement chamber 171 is formed as a rectangular opening in a forward end portion (a left portion in FIG. 8) of the third ceramic layer 170. Diffusive porous layers 173 that separate the measurement chamber 171 from the outside are disposed on both long sides of the third ceramic layer 170. Ceramic insulating layers 175 that form sidewalls of the measurement chamber 171 are disposed on the forward and rearward end sides of the measurement chamber 171.

The measurement chamber 171 is in communication with the outside through the diffusive porous layers 173, and the diffusive porous layers 173 allow gas diffusion between the outside and the measurement chamber 171 under prescribed rate-determining conditions.

The fourth ceramic layer 150 includes a cell layer 151 including a rectangular plate-shaped solid electrolyte body 152, a reference gas-side electrode 153 disposed on the back side of the solid electrolyte body 152, and a measurement gas-side electrode 155 disposed on the front side of the solid electrolyte body 152. A rectangular through opening 151h is provided in a forward end portion (a left portion in FIG. 8) of the cell layer 151, and the solid electrolyte body 152 is embedded in the through opening 151h. The reference gas-side electrode 153 has a reference gas-side electrode portion 153E and a lead portion 153L extending rearward from the reference gas-side electrode portion 153E. The measurement gas-side electrode 155 has a measurement gas-side electrode portion 155E and a lead portion 155L extending rearward from the measurement gas-side electrode portion 155E.

The solid electrolyte body 152, the reference gas-side electrode 153, and the measurement gas-side electrode 155 form a cell for detecting the concentration of oxygen in the measurement gas, and the measurement gas-side electrode portion 155E is exposed to the measurement chamber 171. The reference gas-side electrode portion 153E is in communication with the outside through the lead portion 153L and through holes.

The lead portion 153L is electrically connected to the sensor pad 14 through through holes formed in the cell layer 151, the third ceramic layer 170, the second ceramic layer 160, and the first ceramic layer 180. The lead portion 155L is electrically connected to the sensor pad 15 through through holes formed in the third ceramic layer 170, the second ceramic layer 160, and the first ceramic layer 180.

A signal from the reference gas-side electrode 153 and the measurement gas-side electrode 155 is outputted from the sensor pads 14 and 15 through the two lead wires 79 to the outside, and the concentration of oxygen is thereby detected.

In the gas sensor element 19, the direction and magnitude of electric current flowing between the electrodes of the oxygen pump cell (second ceramic layer) 160 are adjusted such that a voltage (electromotive force) generated between the electrodes of the detection cell (fourth ceramic layer) 150 becomes equal to a prescribed value (e.g., 450 mV), and an oxygen sensor element that linearly detects the concentration of oxygen in the measurement gas according to the electric current flowing through the oxygen pump cell 160 is thereby formed.

The heater layer 145 includes a first layer 145a, a second layer 145b, and a heating element 146 disposed between the first layer 145a and the second layer 145b. The first layer 145a faces the fourth ceramic layer 150. The heating element 146 includes a heat generating portion 146m having a meandering pattern and two lead portions 146L extending rearward from opposite ends of the heat generating portion 146m.

The lead portions 146L are electrically connected to the heater pads 16 and 17 through through holes formed in the second layer 145b. When an electric current is applied to the heating element 146 from the heater pads 16 and 17 through the two lead wires 78, the heating element 146 generates heat, and the solid electrolyte bodies 152 and 162 are thereby activated.

Referring next to FIGS. 10A to 10C, 11, 12A, 12B and 13, a gas sensor element production method according to the second embodiment of the present invention will be described.

Figure 10A:
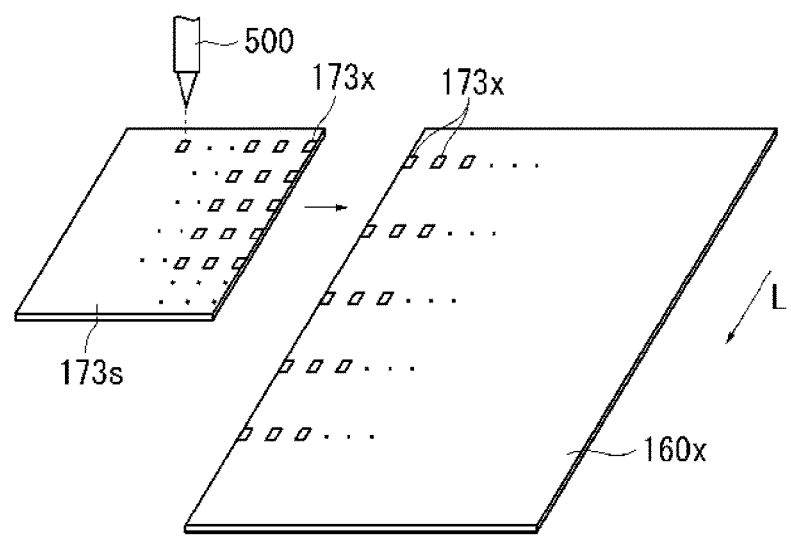
FIGS. 10A to 10C are a set of illustrations showing a transferring step and an application step in the gas sensor element production method according to the second embodiment of the present invention.

First, as shown in FIG. 10A, a sheet 173s whose composition is the same as the composition of the diffusive porous layers 173 before firing is prepared, and a plurality of green diffusive porous layer pieces 173x having prescribed dimensions are cut from the sheet 173s using, for example, a laser 500. Then the plurality of green diffusive porous layer pieces 173x are transferred from the sheet 173s onto an insulating first ceramic green sheet 160x (a transferring step).

The first ceramic green sheet 160x becomes the cell layer 161 (the second ceramic layer 160) through firing. The first ceramic green sheet 160x has a size that allows for production of a plurality of gas sensor elements 19 therefrom. It is also provided with a plurality of green solid electrolyte bodies 162, a plurality of pump electrodes 163, and a plurality of counter electrodes 165, although they are not shown. The number of sets of these components is equal to the number of gas sensor elements 19. The green diffusive porous layer pieces 173x are transferred to regions outside the solid electrolyte bodies 162 in the first ceramic green sheet 160x.

Figure 10B:
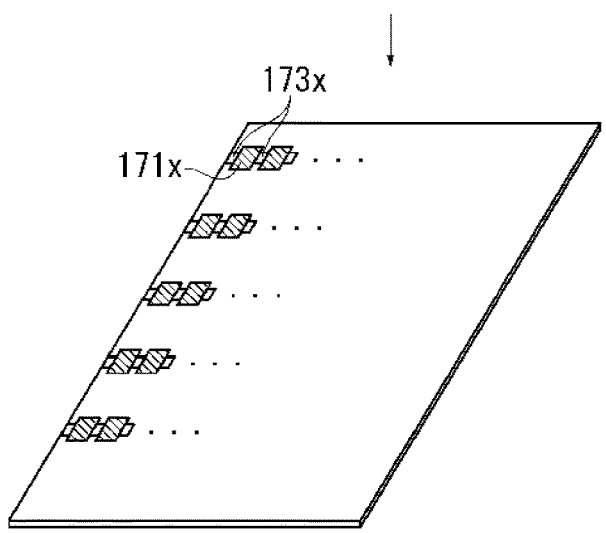

Next, as shown in FIG. 10B, a paste for a burnable carbon layer 171x is printed onto regions between adjacent green diffusive porous layer pieces 173x in the width direction of the gas sensor elements 19. The burnable carbon layers 171x are burnt off when the first ceramic green sheet 160x is fired, and spaces serving as measurement chambers 171 are thereby formed.

Figure 10C:
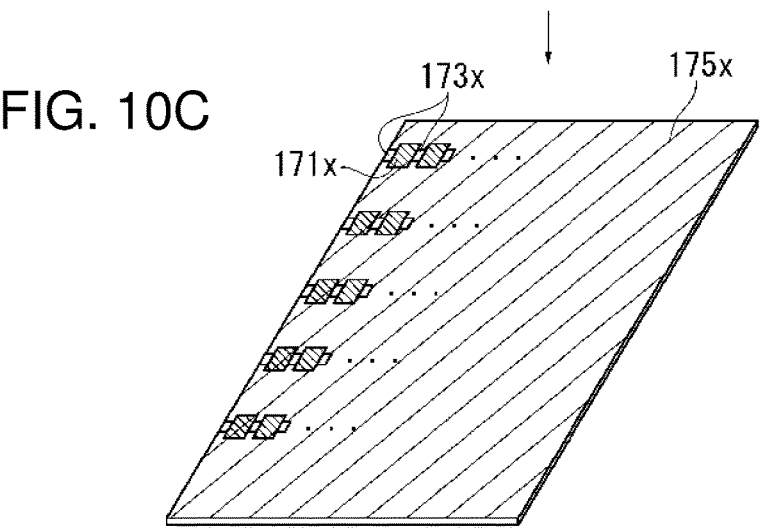

Next, as shown in FIG. 10C, an insulating paste 175x is applied to the first ceramic green sheet 160x except for the regions on which the green diffusive porous layer pieces 173x and the burnable carbon layers 171x are present (an application step). The insulating paste 175x later becomes the ceramic insulating layer 175 through firing.

Figure 11:
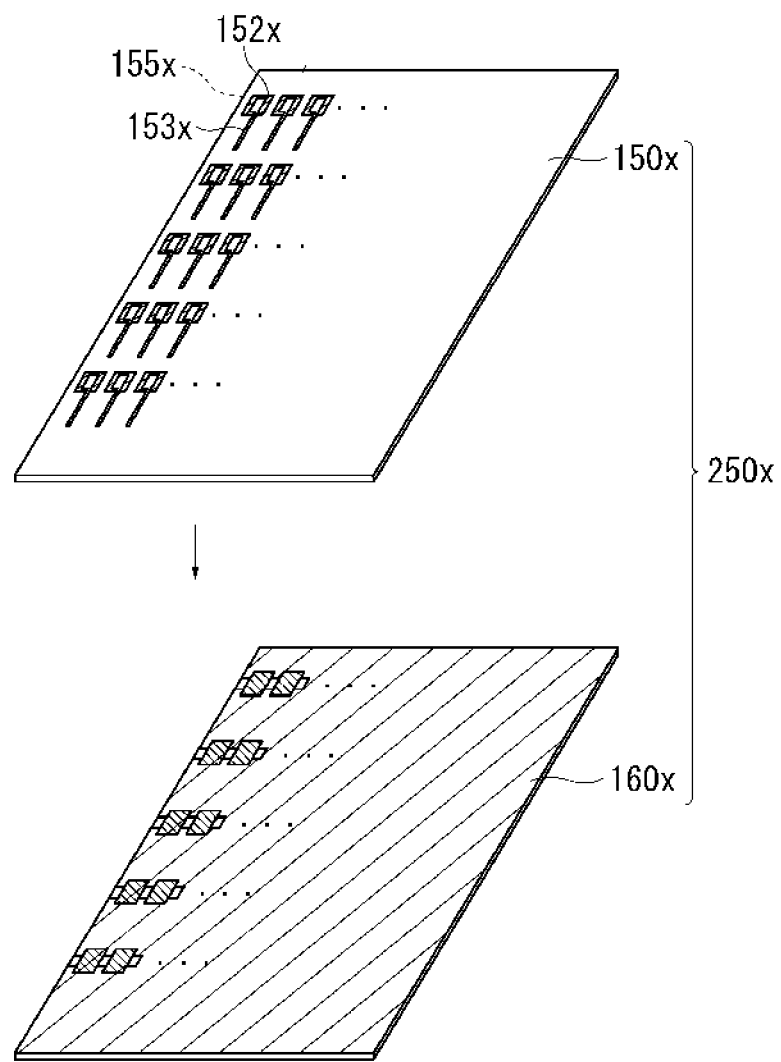
FIG. 11 is an illustration showing a laminating step in the gas sensor element production method according to the second embodiment of the present invention.

Next, as shown in FIG. 11, a second ceramic green sheet 150x is prepared. Then the first ceramic green sheet 160x and the second ceramic green sheet 150x are laminated to form a ceramic laminate 250x (a laminating step).

The second ceramic green sheet 150x later becomes the cell layer 151 (the fourth ceramic layer 150) through firing. The second ceramic green sheet 150x has a size that allows for production of a plurality of gas sensor elements 19 therefrom and is provided with a plurality of green solid electrolyte bodies 152x each provided with a green reference gas-side electrode 153x and a green measurement gas-side electrode 155x. The number of green solid electrolyte bodies 152x is equal to the number of gas sensor elements 19.

The second ceramic green sheet 150x and the first ceramic green sheet 160x are laminated such that each green measurement gas-side electrode 155x on the green sheet 150x faces the corresponding one of the burnable carbon layers 171x on the green sheet 160x.

Figure 12A:
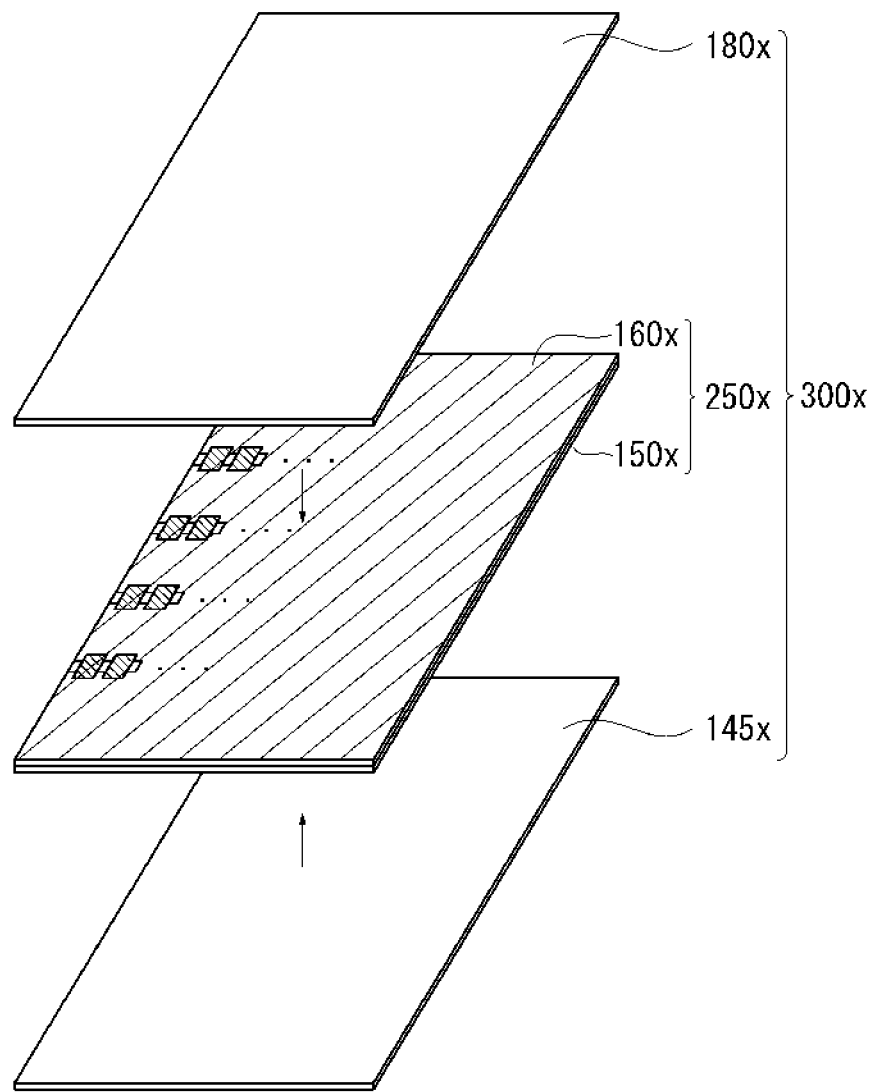
FIGS. 12A and 12B are a set of illustrations showing a cutting step in the gas sensor element production method according to the second embodiment of the present invention.

Next, as shown in FIG. 12A, a green first ceramic layer 180x and a heater layer 145x are laminated onto the ceramic laminate 250x to thereby obtain a final laminate 300x.

Figure 12B:
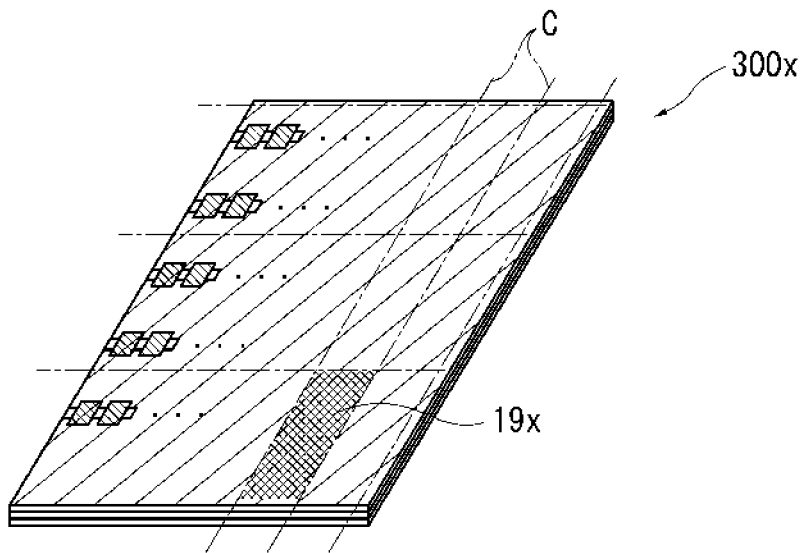

Next, as shown in FIG. 12B, the final laminate 300x including the ceramic laminate 250x is cut along prescribed cutting lines C to obtain a plurality of gas sensor element pieces 19x (a cutting step). Then, although not shown, the gas sensor element pieces 19x are fired to obtain gas sensor elements 19 (a firing step).

As described above, the green diffusive porous layer pieces 173x are cut so as to have the prescribed dimensions in advance and then transferred onto the first ceramic green sheet 160x that later becomes the gas sensor element pieces 19x. Therefore, when the gas sensor element pieces 19x are separated through cutting and are fired to produce the gas sensor elements 19, variations in dimensions of the diffusive porous layers 173 due to production-related variations can be reduced, and variations in output of the gas sensor elements due to variations in gas diffusion distance can be reduced. Since the diffusive porous layers of the gas sensor elements have the same dimensions, variations in responsivity of the gas sensor elements due to variations in gas diffusion distance can also be reduced.

Figure 13:
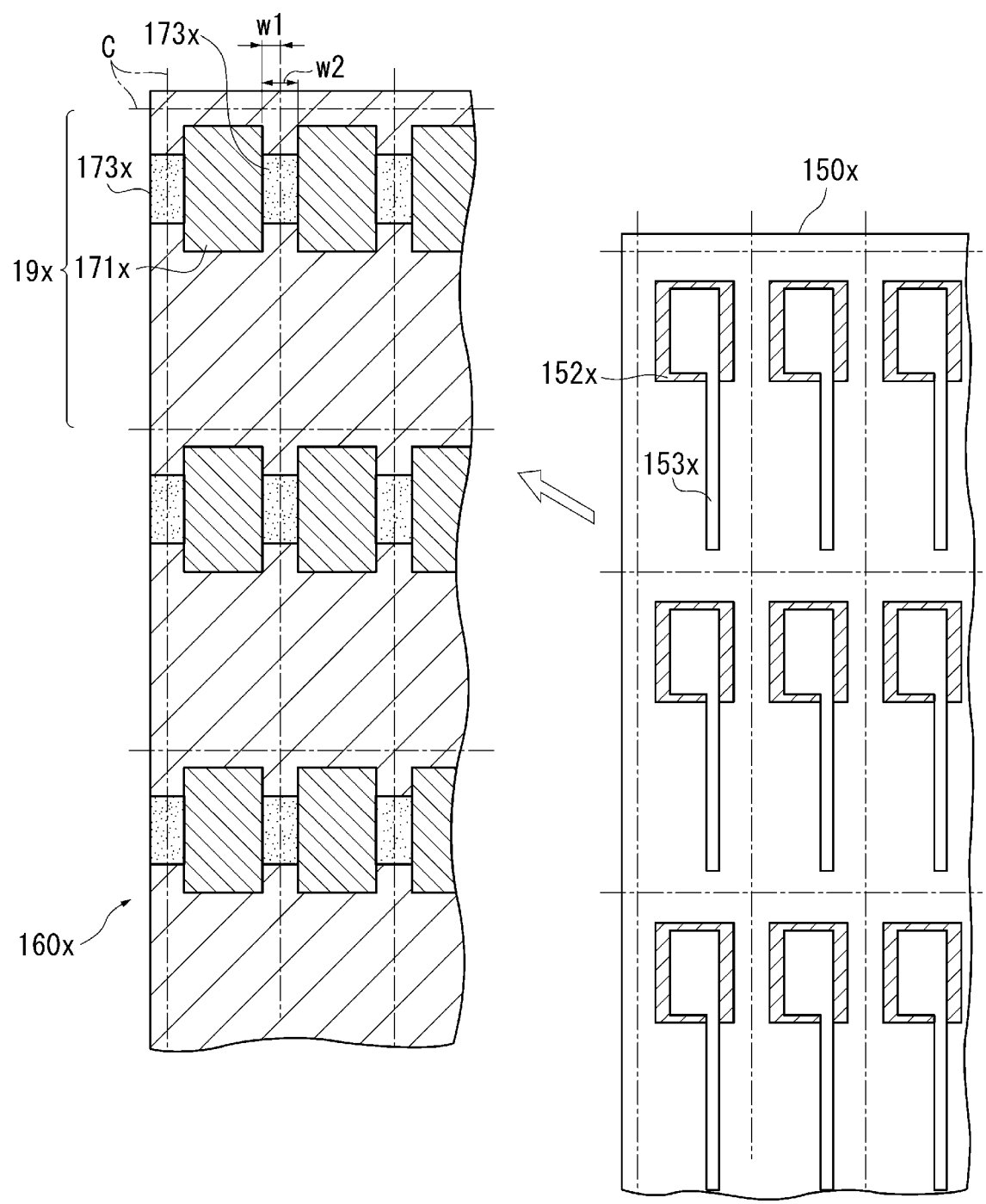
FIG. 13 is an illustration showing a first ceramic green sheet with green diffusive porous layer pieces transferred thereon and an insulating paste applied thereto.

As shown in FIG. 13, in the present embodiment, the green diffusive porous layer pieces 173x form longitudinal sidewalls of the gas sensor element pieces 19x. In the fired gas sensor element 19 shown in FIG. 8, the diffusive porous layer 173 is exposed to the outside.

In the transferring step, each green diffusive porous layer piece 173x is transferred such that the green diffusive porous layer piece 173x extends across a corresponding one of the cutting lines C and the centerline of the green diffusive porous layer piece 173x extending along the surface to be exposed to the outside (in the lengthwise direction of the green diffusive porous layer piece 173x) is aligned with the corresponding one of the cutting lines C. Therefore, in the cutting step, the green diffusive porous layer pieces 173x are cut so as to have a width W1 exactly one half their original width W2, whereby the gas sensor element pieces 19x (the gas sensor elements 19) can be produced such that their green diffusive porous layer pieces 173x have the same width W1. Therefore, the green diffusive porous layer pieces 173x can be used with no waste.

The present invention is not limited to the above embodiments. The invention is applicable to any gas sensor (gas sensor element) including a solid electrolyte body, a reference gas-side electrode, a measurement gas-side electrode, a measurement chamber, and a diffusive porous layer and is applicable to an oxygen sensor (oxygen sensor element) constituting any of the above embodiments. Further, the present invention is not limited thereto to an oxygen sensor. For example, the present invention may be applied to NOx sensors (NOx sensor elements) for detecting the concentration of NOx in measurement gas, HC sensors (HC sensor elements) for detecting the concentration of HC, etc.

No limitation is imposed on the shape and dimensions of the diffusive porous layer.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2017-93031 filed May 9, 2017, the disclosure of which is incorporated herein by reference in its entirety.

What is claimed is:

1. A method for producing gas sensor elements each extending in an axial direction and including a solid electrolyte body, a reference gas-side electrode and a measurement gas-side electrode disposed on surfaces of the solid electrolyte body, a measurement chamber to which the measurement gas-side electrode is exposed, a diffusive porous layer disposed in the measurement chamber and exposed to an outside, and a ceramic insulating layer forming sidewalls of the measurement chamber, the method comprising at least:
   a transferring step of preparing a sheet including a plurality of green diffusive porous layer pieces that are cut in advance to have prescribed dimensions and that later become, through firing, the diffusive porous layer and transferring the plurality of green diffusive porous layer pieces from the sheet onto an insulating first ceramic green sheet having a size that allows for production of a plurality of the gas sensor elements therefrom;
   an application step of applying an insulating paste that later becomes the ceramic insulating layer through firing to the first ceramic green sheet;
   a laminating step of preparing a second ceramic green sheet provided with a plurality of the solid electrolyte bodies each provided with the reference gas-side electrode and the measurement gas-side electrode and laminating the first ceramic green sheet onto the second ceramic green sheet to thereby form a ceramic laminate;
   a cutting step of cutting the ceramic laminate along prescribed cutting lines to obtain a plurality of gas sensor element pieces; and
   a firing step of firing the gas sensor element pieces to thereby obtain the gas sensor elements.

2. The method for producing gas sensor elements as claimed in claim 1, wherein, in the transferring step, each green diffusive porous layer piece is transferred such that the green diffusive porous layer piece extends across a corresponding one of the cutting lines and a centerline of the green diffusive porous layer piece extending along its longitudinal direction is aligned with the corresponding one of the cutting lines.

3. The method for producing gas sensor elements as claimed in claim 1, wherein, in the application step, the insulating paste is applied in a state in which a forward end of an elongated region where the measurement chamber is to be formed is flush with forward ends of the green diffusive porous layer pieces located adjacent to the elongated region.

4. The method for producing gas sensor elements as claimed in claim 2, wherein, in the application step, the insulating paste is applied in a state in which a forward end of an elongated region where the measurement chamber is to be formed is flush with forward ends of the green diffusive porous layer pieces located adjacent to the elongated region.

\* \* \* \* \*